Figure 1:
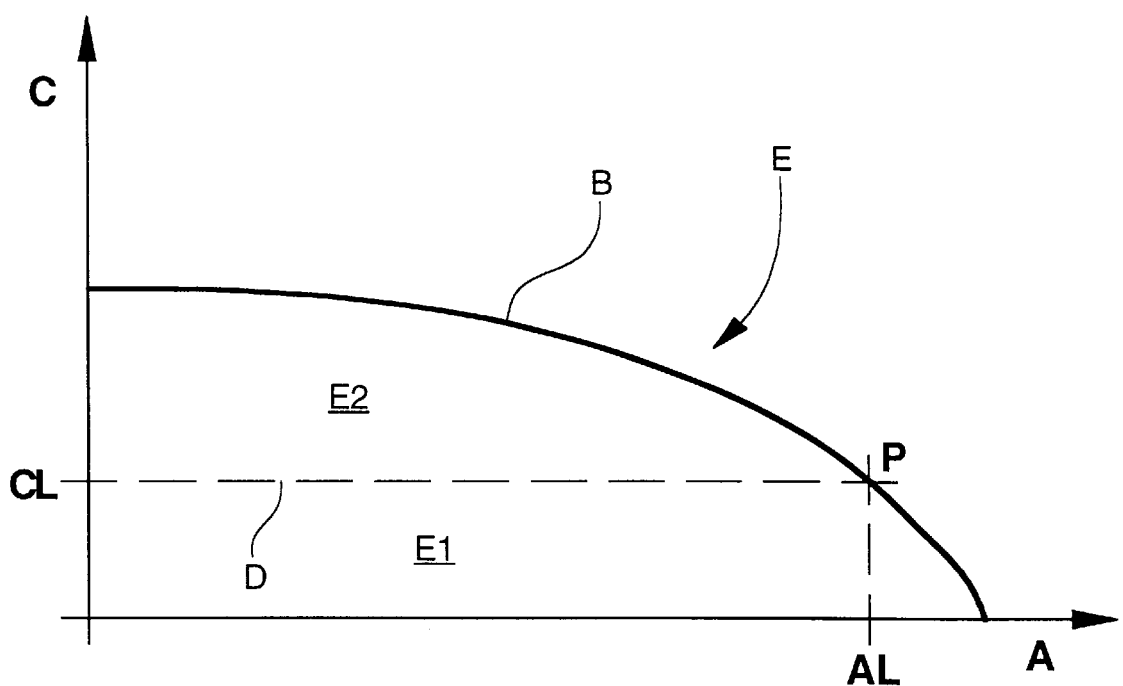

United States Patent [19]
Farine et al.

[11] Patent Number: 6,113,259
[45] Date of Patent: Sep. 5, 2000

[54] ELECTRONIC TIMEPIECE SUPPLIED BY A GENERATOR DRIVEN BY A MECHANICAL POWER SOURCE

[75] Inventors: Pierre-André Farine, Neuchâtel; Jean-Jacques Born, Morges; Francis Chabloz, Neuchâtel, all of Switzerland

[73] Assignee: Asulab S.A., Bienne, Switzerland

[21] Appl. No.: 09/063,775

[22] Filed: Apr. 22, 1998

[30] Foreign Application Priority Data

Apr. 28, 1997 [CH] Switzerland ............................. 0983/97
Jun. 25, 1997 [CH] Switzerland ............................. 1542/97

[51] Int. Cl.[7] ...................................................... H02P 9/04
[52] U.S. Cl. .......................... 368/140; 368/155; 368/203; 368/157
[58] Field of Search ..................... 368/140, 155, 368/157, 203, 148, 149, 156, 204; 322/29

[56] References Cited

U.S. PATENT DOCUMENTS 4,799,003  1/1989  Tu et al. ................................. 368/140
5,517,469  5/1996  Wiget ..................................... 368/140

FOREIGN PATENT DOCUMENTS 0 239 820  10/1987  European Pat. Off. .
39 03 706   8/1989  Germany .

*Primary Examiner*—Bernard Roskoski
*Attorney, Agent, or Firm*—Griffin & Szipl, P.C.

[57] ABSTRACT

The timepiece (1) includes a mainspring (2) driving the rotor (3a) of an electromechanical converter (3) and time display hands (6). A circuit (7) for enslaving the real angular position of the rotor (3a) to its desired angular position is supplied with electrical energy by the converter (3). In order to increase the autonomy of the timepiece (1), the enslaving circuit (7) includes means (28) which store a portion of the electrical energy generated by the converter (3) and means (21, 23 to 27) which use this stored electrical energy to apply driving pulses (IM) to the converter (3) when the rotor (3a) has a greater retardation than a determined retardation, with respect to its desired angular position.

7 Claims, 3 Drawing Sheets

ELECTRONIC TIMEPIECE SUPPLIED BY A GENERATOR DRIVEN BY A MECHANICAL POWER SOURCE

The present invention concerns a timepiece including:

an electromechanical converter including a rotor having at least one permanent magnet and at least one coil magnetically coupled to said magnet for generating a first electrical energy in response to a rotation of said rotor;

a mechanical power source mechanically coupled to said rotor for applying thereto a first driving torque causing said rotation of said rotor in a determined direction and at a higher rotational speed than a determined desired speed, said rotor having a real angular position which fluctuates permanently during said rotation;

means for displaying time information mechanically coupled to said rotor and to said mechanical power source; and enslaving means including means for generating a comparison signal having a value representing a difference between said real angular position of said rotor and a desired angular position which fluctuates regularly at said desired speed, and braking means responding to said comparison signal to apply a braking torque imposing a lower rotational speed on said rotor than said desired speed when said difference constitutes an advance of said real angular position of said rotor with respect to said desired angular position.

Such timepieces are disclosed, in particular in European Patent Application Nos. 0 239 820 and 0 679 968. In these known timepieces, the converter is used simply as a generator for supplying the electrical energy necessary to supply the enslaving circuit in response to the mechanical power supplied by the source of such mechanical power.

The features of the various components of these timepieces are selected in such a way that the real rotational speed of the generator rotor normally tends to be higher than a desired speed which is that at which the timepiece operates properly, and the enslaving circuit is arranged to enslave said real rotational speed to said desired speed.

It can easily be seen that such enslaving of the rotor's real rotational speed to the desired speed thereof is equivalent to enslaving the rotor's real angular position to a desired angular position, which is that which the rotor would occupy if it had rotated permanently at its desired speed since the timepiece was switched on, and which thus permanently fluctuates at the desired rotor rotational speed.

In the timepiece of this type which is disclosed in aforementioned European Patent Application No. 0 239 820, enslaving is achieved by periodically braking the rotor during a period of time whose length depends on whether the rotor is advanced or retarded with respect to its desired angular position.

In the timepiece of this type which is disclosed in aforementioned European Patent Application No. 0 679 968, enslaving is achieved by periodically braking the rotor during a fixed period of time each time the rotor is advanced with respect to its desired angular position.

It will easily be understood that, however the rotor's rotational speed is enslaved to the desired speed, the real angular position of such rotor is almost always advanced or retarded with respect to its desired angular position. The rotor may be advanced or retarded by more than 360°, or even several times 360°, for example following an angular shock to the timepiece.

In order to simplify the description which follows, it will be made with reference to a case wherein the mechanical power source of the timepiece is a conventional mainspring such as is currently used in mechanical wristwatches. Those skilled in the art will however see without any difficulty that the invention which will be described hereinafter can be used whatever the nature of the mechanical power source.

An example of the well known alternative of the mechanical torque C supplied by a mainspring as a function of its let down angle A is represented in FIG. 1 by the curve B.

In order for said mainspring to be able to be used in a timepiece of the same type as those which were described hereinbefore, it is obviously necessary that, during at least part of its letting down, the driving torque C which it supplies is greater than a limit torque CL, which is the torque at which the generator rotor driven by said spring rotates just at its desired speed when it is not braked by the circuit for enslaving its rotational speed.

The value of this limit torque CL obviously depends upon the mechanical characteristics of the various elements driven by the mainspring, as well as the electric characteristics of the generator and the circuit supplied thereby. An example of such a limit torque CL is represented in FIG. 1 by a straight dotted line C. This straight line C intersects curve B at a point P at which the mainspring let down angle has a value AL.

It is well known that the mechanical power E available in the mainspring whose driving torque is represented by curve B of FIG. 1 is equal, when the spring is completely wound, to the surface delimited by such curve B and by axes C and A of FIG. 1.

It may be considered that a portion E1 of said energy E is used, during letting down of the mainspring, to make the generator rotor rotate at its desired speed and, after conversion into electrical energy by said generator, to supply the rotational speed enslaving circuit of said rotor.

This portion E1 of mechanical energy E is equal to the surface delimited by axes A and C, by straight line D and by vertical line having abscissa AL.

Another portion of mechanical energy E, designated E2, is used to accelerate the generator rotor and, after conversion into electrical energy, to brake said rotor when necessary. This mechanical energy E2 is equal to the surface delimited by axis C, straight line D and curve B.

It can be seen that the autonomy of the known timepieces briefly described hereinbefore, i.e. the period of time during which they operate properly after their mainspring has been completely wound for the last time, is limited to the time which elapses until the driving torque supplied by said mainspring reaches limit torque value CL.

This autonomy may obviously be increased by using a mainspring supplying a higher torque and/or having a larger total let down angle. However, the volume occupied by such a mainspring also increases, which may make the use thereof difficult, or even impossible, in a timepiece of small volume such as a wristwatch.

An object of the present invention is to propose a timepiece of the same type as those which were described hereinbefore, but whose autonomy is greater than that of the latter, without however significantly increasing the space requirement of the clockwork movement of such timepiece.

Another object is to provide such a timepiece which is reliable and whose operating accuracy is assured as long as the power necessary for the operation thereof is available.

These objects are achieved by the timepiece as claimed.

As will be made clear by the description which follows, the features of the invention allow a timepiece to have greater autonomy without significantly increasing the space requirement of its movement.

Figure 2:
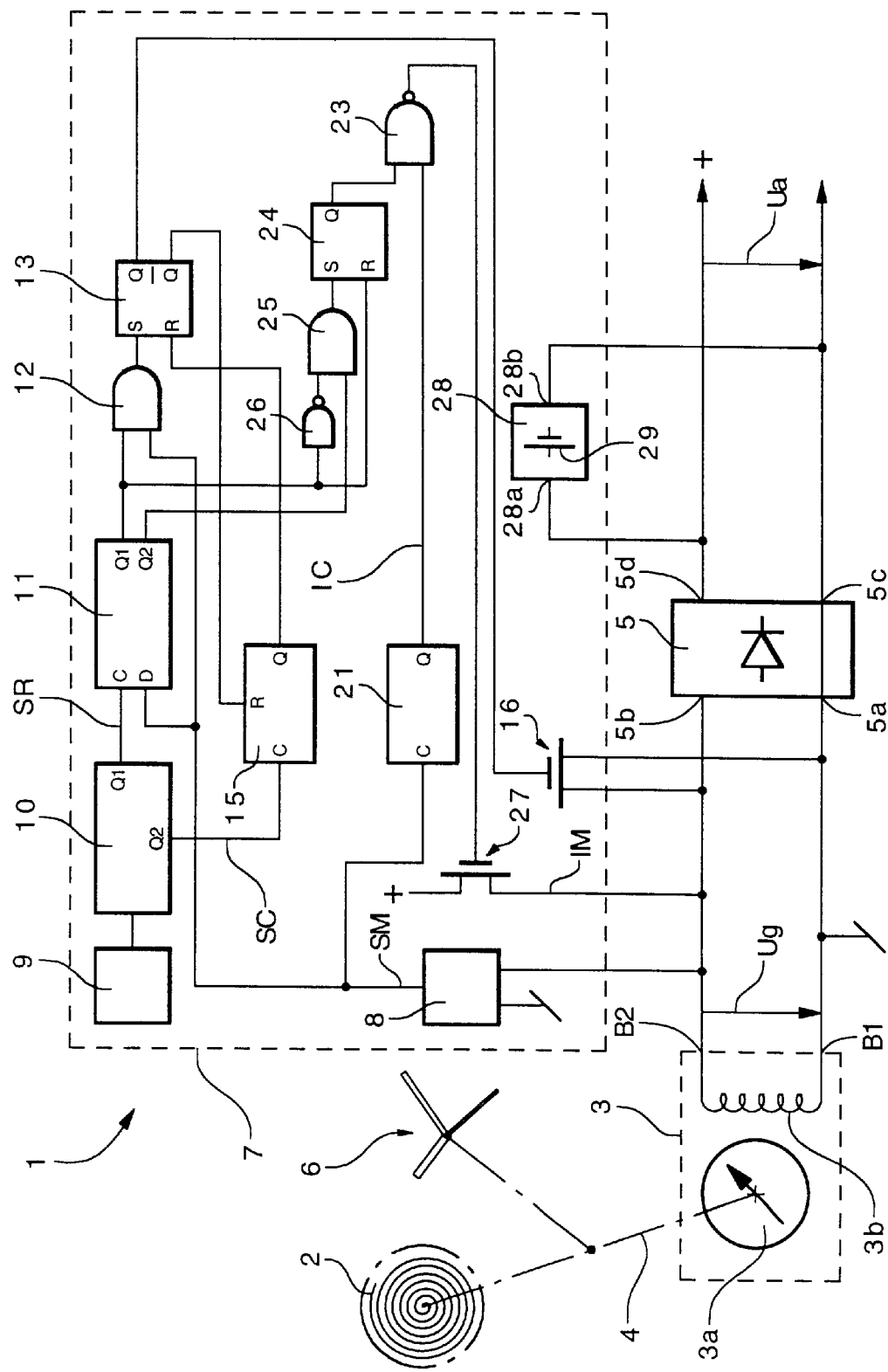
Figure 3:
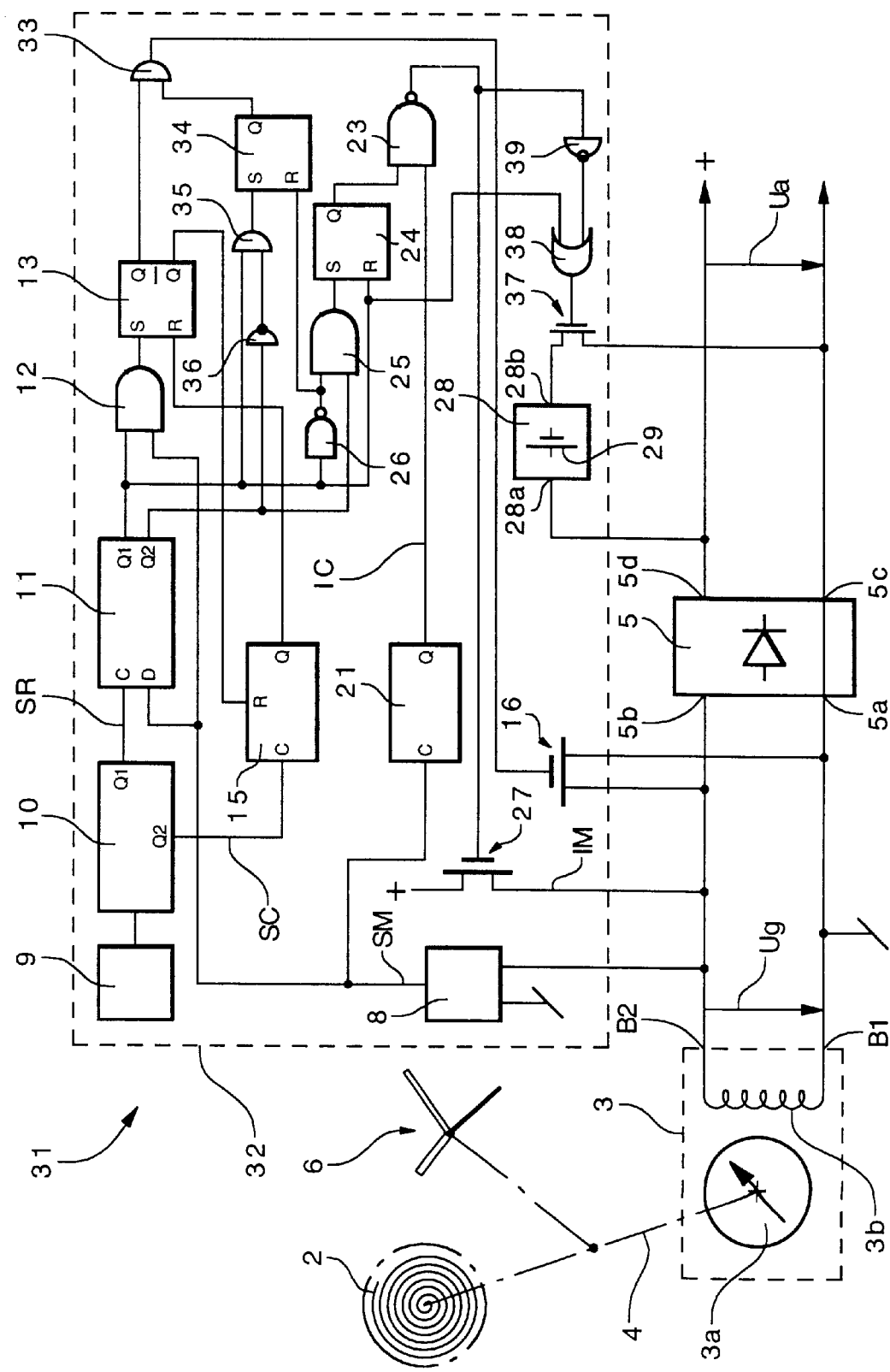

Other objects and advantages of the present invention will be made clear by the following description, which is made with reference to the attached drawings in which:

FIG. 1, already mentioned, shows the fluctuation in the driving torque supplied by a mainspring as a function of its let down angle;

FIG. 2 shows schematically and partially an embodiment of a timepiece according to the present invention; and FIG. 3 shows schematically and partially another embodiment of a timepiece according to the present invention.

In the embodiment shown schematically and by way of non-limiting example in FIG. 2, the timepiece according to the present invention, which is designated by the general reference 1, includes a mechanical power source formed by a mainspring. This mainspring, designated by the reference 2, has only been shown very schematically since it may be of the same type as any of the well known mainsprings which are used in conventional mechanical timepieces. It will be assumed that the fluctuation in the driving torque supplied by this mainspring 2 as a function of its let down angle is that which is shown in FIG. 1.

This mainspring 2 is coupled to a manual or automatic winding mechanism which has not been shown since it may resemble any of the well known winding mechanisms which are also used in conventional mechanical timepieces.

Mainspring 2 is mechanically coupled to rotor 3a of an electromechanical converter 3 via a gear train 4 symbolised by a dotted line. This converter 3 also includes a coil 3b and it will not be described in detail since it may been made in various well known ways known to those skilled in the art.

It will simply be mentioned that, in the present example, rotor 3a includes a bipolar magnet which has simply been represented by an arrow representing its axis of magnetisation.

It will also be mentioned that coil 3b is magnetically coupled to the permanent magnet of rotor 3a, for example via a stator which has not been shown, so as to generate across its terminals B1 and B2, in response to any rotation of rotor 3a, an alternating voltage Ug whose period is equal to the period of rotation of rotor 3a, i.e. to the time taken by rotor 3a to make one revolution. Terminals B1 and B2 of coil 3b obviously constitute the terminals of converter 3.

Timepiece 1 also includes a rectifier circuit 5 whose inputs 5a and 5b are respectively connected to terminals B1 and B2 of converter 3 and whose outputs 5c and 5d provide an at least substantially direct voltage Ua in response to alternating voltage Ug generated by converter 3. This voltage Ua is intended to supply the various electronic circuits which will be described hereinafter, via conducting leads which have not been shown.

Rectifier 5 will not be described in detail since it may be similar to any of the rectifiers well known to those skilled in the art. It will simply be mentioned that, for a reason which will be made clear hereinafter, this rectifier 5 is arranged so that direct voltage Ua is greater than the peak value of alternating voltage Ug.

In the present example, terminals 5a and 5c of rectifier 5 are connected to each other as well as to terminal B1 of converter 3. Furthermore, the potential of these three terminals 5a, 5c and B1 has been arbitrarily selected as reference potential, or ground, and all the voltages which will be mentioned in the following description will be voltages measured with respect to this reference potential.

Accordingly alternating voltage Ug is thus symmetrical with respect to said reference potential when rotor 3a rotates at a constant speed and coil 3b is not short-circuited.

Moreover, in the following description, the various signals will be described as being at the logic state "0" or logic state "1" according to whether the potential of the points where they are measured is substantially equal to the reference potential, or respectively, the potential of terminal 5d of rectifier 5. In the following description, these logic states will simply be called state "0" and, respectively, state "1".

Timepiece 1 also includes means for displaying the current time which are formed, in this example, by conventional hands, designated by the reference 6, but which may also be formed by other well known elements, such as discs, drums or others. It may also include one or more additional display devices, such as a date display device, phases of the moon display device, or others. An additional display device of this type has not been shown.

Hands 6 and, if required, the additional device or devices, are mechanically connected to mainspring 2 and rotor 3a of converter 3 via a gear train of which at least one portion may be common to a portion of gear train 4. In FIG. 1, this gear train connected to hands 6 has not been separately referenced, and it is also represented by a dotted line.

Timepiece 1 also includes a timesetting mechanism for hands 6 and, if required, for correcting the additional device or devices, which has not been shown since it may be similar to any of the various mechanisms of this type which are well known to those skilled in the art.

In the timepiece according to the present invention shown in FIG. 2, enslaving of the real rotational speed of rotor 3a to its desired rotational speed Vc, and thus of the real angular position of said rotor 3a to its desired angular position, is assured by an enslaving circuit 7 which is supplied by a portion of the mechanical power stored in mainspring 2 after transformation thereof into electrical energy by converter 3 and after alternating voltage Ug which is generated by the latter has been transformed into a direct voltage Ua by rectifier 5.

The elements of enslaving circuit 7 which determine the rotational speed of rotor 3a and which will be described hereinafter, and gear train 4, are arranged so that hands 6 rotate at their normal speeds when rotor 3a rotates at desired speed Vc. It will be assumed that, in the present example, said desired speed Vc has been fixed at 4 revolutions per second.

Moreover, for a reason which will be made clear by the following description, the features of mainspring 2 and the various elements which it drives, as well as the features of converter 3, are selected so that the average rotational speed of rotor 3a is greater than desired speed Vc as long as the driving torque provided by mainspring 2 is higher than limit torque CL defined hereinbefore (FIG. 1), on condition that coil 3 is not short-circuited. Likewise, these features are selected so that said average rotational speed is less than said desired speed Vc if coil 3b is short-circuited, in circumstances which will be described hereinafter, and this is the case even when mainspring 2 is completed wound and the driving torque which it provides thus has it maximum value.

Aforementioned enslaving circuit 7 includes a comparator 8 whose non-inverting input is connected to terminal B2 of converter 3 and whose inverting input is connected to the reference potential, so that the signal generated by its output which will be called signal SM in the following description, is alternately at state "0" and state "1" according to whether voltage Ug provided by converter 3 is negative or positive.

The period of signal SM is obviously equal to that of voltage Ug so that, in particular, this signal SM period is 250 milliseconds when rotor 3a of converter 3 rotates at its desired speed Vc which is 4 revolutions per second in the present example as mentioned hereinbefore.

Moreover, signal SM passes from its "0" state to its "1" state each time that rotor 3a of converter 3 passes by a determined angular position, which is that at which voltage Ug passes its zero value while increasing.

Signal SM is thus both a rotational speed measuring signal for rotor 3a and a signal for detecting the passage of said rotor 3a by the determined angular position defined hereinbefore.

Enslaving circuit 7 also includes a source of a reference signal SR, formed, in this example, by an oscillator 9, which may be a quartz oscillator, and a frequency dividing circuit 10 having an output Q1 which provides signal SR in response to a signal generated by oscillator 9.

This oscillator 9 and this frequency dividing circuit 10 will not be described in detail since they may be made in various ways well known to those skilled in the art. It will simply be mentioned that oscillator 9 and frequency divider 10 are arranged so that the period of signal SR is equal to that of signal SM when rotor 3a of converter 3 rotates at its desired speed Vc, i.e. 250 milliseconds in the present example.

This result may be obtained, still by way of example, by using, for oscillator 9, a similar oscillator to that which is used in the majority of electronic timepieces and which provides a signal having a frequency of 32.768 Hz, and by making frequency divider 10 in the well known form of a series of 13 flip-flops.

It will also be mentioned that frequency divider 10 includes a second output, designated Q2, providing a signal SC having a much shorter period, for example of the order of one hundred times shorter, than that of signal SR, and whose usefulness will be made clear hereinafter. In the present example, this signal SC may be provided by the output of the sixth flip-flop of frequency divider 10 and thus have a period equal to approximately 1.95 milliseconds.

Enslaving circuit 7 also includes a reversible counter, or up-down counter, which is designated by the reference 11. The up counting input C of this counter 11 is connected to output Q of frequency divider 10 and thus receives signal SR, and its down counting input D is connected to the output of comparator 8 and thus receives signal SM.

This up-down counter 11 will not be described in detail since it may be made in various well known ways. It will simply be specified that it is sensitive to the leading edges of the pulses which it receives, i.e. to passages from the "0" state to the "1" state of signals SR and SM. In other words, the content of counter 11, i.e. the binary number formed by the "0" or "1" states of the direct outputs of the various flip-flops of which it is formed, is incremented by one unit at each leading edge of the SR signal pulses and decremented by one unit at each leading edge of the SM signal pulses. Counter 11 also includes well known means which allow any ambiguity due to any superposition in time of the pulses which it receives at its inputs C and D, to be removed.

Counter 11 includes n flip-flops. The direct outputs of the last and penultimate of said flip-flops are respectively designated Q1 and Q2.

It will also be recalled that, since counter 11 is formed of n flip-flops, its content may have any value greater than or equal to zero and less than or equal to $2^n-1$.

Moreover, the operation of counter 11 is cyclical, i.e. in particular, when its content is equal to zero, such content takes the value $2^n-1$ in response to a pulse applied to its down counting input D and, when such content is equal to $2^n-1$, it takes the value zero in response to a pulse applied to its up counting input C.

Those skilled in the art will easily see that, when the content of counter 11 is greater than or equal to zero and less than $2^{(n-1)}$, output Q1 of counter 11 is at state "0" and that output Q1 is at state "1" when such content is greater than or equal to $2^{(n-1)}$, and less than or equal to $2^n-1$.

Moreover, when the content of counter 11 is greater than or equal to zero and less than $2^{(n-2)}$, output Q2 of counter 11 is also at state "0", whereas output Q2 is at state "1" when such content is greater than or equal to $2^{(n-2)}$ and less than $2^{(n-1)}$.

Output Q1 of up-down counter 11 is connected to a first input of an AND gate 12 whose second input is connected to the output of comparator 8.

The output of this gate 12 is connected to the input S of an R-S type flip-flop 13, whose input R is connected to the output Q of a counter 15.

Like up-down counter 11 described hereinbefore, flip-flop 13 is sensitive to the leading edges of the pulses which it receives at its inputs S and R. In other words, the non-inverting output Q and inverting output $\overline{Q}$ of said flip-flop 13 respectively take state "1" and state "0" in response to each leading edge of the signal applied to its input S, and respectively take state "0" and state "1" in response to each leading edge of the signal applied to its output R.

Counter 15 is a simple counter, not an up-down counter and it is formed, in this example, of five flip-flops connected in series in a conventional manner, so that its output Q, which is the non-inverting output of its fifth flip-flop, passes from state "0" to state "1", when its content passes from the value fifteen to the value sixteen.

Up-counting input C of counter 15 is connected to output Q2 of frequency divider 10 and thus receives signal SC, and its resetting input R is connected to inverting input $\overline{Q}$ of flip-flop 13.

Again, like up-down counter 11, counter 15 is sensitive to the leading edges of the signal applied to its counting input C. Moreover, its content is kept at the value zero as long as its input R is at state "1".

Enslaving circuit 7 also includes an electric braking element for rotor 3a of converter 3, which is formed in the present example by an n type MOS transistor, designated by the reference 16, whose source and drain are respectively connected to terminals B1 and B2 of converter 3, and whose gate is connected to non-inverting output Q of flip-flop 13.

Those skilled in the art will easily see that transistor 16 is blocked or conductive according to whether its gate is at state "0" or "1" since it is of the n type and whether its source is at the reference potential.

Enslaving circuit 7 also includes a time-delay circuit 21 having a control input C connected to the output of comparator 8 and thus receiving signal SM, and an output Q.

This time delay circuit 21 will not be described in detail since those skilled in the art will have no difficulty in making it, knowing that it is intended to provide at its output Q a pulse IC of determined duration D, during which such output Q is at state "1", this pulse IC beginning after a delay time T, which is also determined, has elapsed since signal SM passed from state "0" to state "1". This duration D and delay time T will be specified hereinafter.

Output Q of time delay 21 is connected to a first input of a NAND gate having a second input which is connected to output Q of an R-S type flip-flop 24.

Input S of flip-flop 24 is connected to the output of an AND gate 25 a first input of which is connected to output Q2 of up-down counter 11 and a second input of which is connected to output Q1 of said counter 11 via an inverter gate 26.

Input R of flip-flop 24 is directly connected to output Q1 of counter 11.

Enslaving circuit 7 also includes a control element formed in the present example by a p type MOS transistor, designated by the reference 27, whose source is connected to the positive potential, designated by the sign +, of direct supply voltage Ua, and whose drain is connected to terminal B2 of coil 3b of converter 3. The gate of transistor 27 is connected to the output of gate 23.

Those skilled in the art will easily see that transistor 27 is blocked or conductive according to whether its gate is at state "1" or, respectively at state "0" since it is of the p type and its source is at the positive potential.

Enslaving circuit 7 also includes a storage device 28 intended to store and return electrical energy in circumstances which will be described hereinafter.

Device 28, which includes a positive terminal 28a and a negative terminal 28b respectively connected to terminals 5c and 5d of rectifier 5, will not be described in detail since it may be made in various ways well known to those skilled in the art. It will simply be mentioned that it includes, in the present example, a conventional accumulator 29, which may be of the same kind as any of the well known accumulators suitable for such use. If necessary, this device may also include a circuit for adapting the operation voltage of this accumulator 29 to voltage Ua. This device 28 may also include an monitoring circuit intended to limit the charging current of said accumulator 29, to prevent overcharging the latter and/or to prevent accumulator 29 being too deeply discharged.

Enslaving circuit 7 also includes an initialising circuit which has not been shown in order to avoid unnecessarily overloading FIG. 2 and which is a circuit well known to those skilled in the art. It will simply be mentioned that it is arranged so as to generate a short initialising pulse at the moment when voltage Ua reaches, while increasing, a determined threshold value, which is equal to or slightly greater than the value at which the various components of enslaving circuit 7 begin to operate properly. This moment will be called initialising moment t0 in the following description. This initialising circuit is connected to frequency divider 10, to counters 11 and 15, to time delay 21 and to flip-flops 13 and 24 so that outputs Q, Q1 or Q2 of all these elements are set at state "0" at moment t0.

When mainspring 2 is completely let down and rotor 3a of converter 3 is not rotating, voltage Ug is obviously zero. If, in addition, accumulator 29 of storage device 28 is discharged, voltage Ua is equal to zero, or in any case insufficient for timepiece 1 to operate.

If mainspring 2 is then rewound, there arrives a moment when rotor 3a begins to rotate, and when voltages Ug and Ua begin to increase.

At moment t0 defined hereinbefore, the pulse generated by the initialising circuit has the effect of setting outputs Q1 and Q2 of frequency divider 10, outputs Q1 and Q2 of up-down counter 11 and outputs Q of counter 15 and time delay 21 to state "0".

As a result of the same initialising pulse, outputs Q and $\overline{Q}$ of flip-flop 13 respectively take the state "0" and logic state "1" and output Q of flip-flop 24 takes state "0".

State "" of output Q of flip-flop 13 puts transistor 16 in its blocking state, so that coil 3b of converter 3 is not short-circuited and the rotational speed of rotor 3a can reach and pass its desired speed Vc. Moreover, state "1" of output $\overline{Q}$ of flip-flop 13 keeps the content of counter 15 at zero.

Furthermore, state "0" of output Q of flip-flop 24 keeps the output of gate 23 at its state "1", so that transistor 27 is put in its blocking state.

As will be made clear hereinafter, accumulator 29 is completely, or at least almost completely discharged when timepiece 1 is stopped. When rotor 3a begins to rotate and voltage Ua reaches a sufficient value, said accumulator 29 begins to charge by absorbing a portion of the electrical energy provided by converter 3, which then operates as a generator. This surplus of electrical energy is of course provided by mainspring 2 and originates from the conversion of at least a portion of mechanical energy E2 defined hereinbefore by converter 3.

This electrical energy stored by accumulator 29 is intended to be used in circumstances which will be described hereinafter.

The operation of timepiece 1 after moment t0 will only be described hereinafter in general terms since those skilled in the art will have no difficulty in reconstituting all the details thereof from the explanations already given.

In this description of the operation of timepiece 1, each of the moments when reference signal SR passes from its state "0" to its state "1" and when the content of counter 11 is thus incremented by one unit will be called reference moment tr. Likewise, each of the moments when measuring signal SM also passes from its state "0" to its state "1" and when the content of counter 11 is thus decremented by one unit will be called measuring moment tm.

It is obvious that the content of up-down counter 11 is permanently equal to the difference between the number of signal SR pulses generated by frequency divider 10 since moment t0 defined hereinbefore and the number of signal SM pulses generated by comparator 8, which is the number of complete revolutions effected by rotor 3a of converter 3, since the same moment t0.

This content of counter 11 is thus permanently representative of the difference between the real angular position of rotor 3a and it desired angular position. Depending on the case, this difference may be an advance or a retardation and may be, if required, several revolutions.

More precisely, when this difference is zero, i.e. when the angular position of rotor 3a coincides, at least to within one revolution, with its desired angular position, the content of counter 11 is also zero.

Likewise, when this difference is a retardation of rotor 3a with respect to its desired angular position, the content of counter 11 is greater than zero and less than $2^{(n-1)}$.

In these two cases, output Q1 of counter 11 is thus at state "0".

Finally, when this difference is an advance of rotor 3a with respect to its desired angular position, the content of counter 11 is less than or equal to $2^n-1$ and greater than or equal to $2^{(n-1)}$.

The operation of timepiece 1 will now be described beginning arbitrarily just after one of moments tm defined hereinbefore and assuming that rotor 3a is then advanced with respect to its desired angular position.

As was seen hereinbefore, output Q1 of counter 11 is thus at state "1". Since signal SM is also at state "1", flip-flop 13 takes the state wherein its outputs Q and $\overline{Q}$ are respectively at state "1" and state "0".

As a result, transistor 16 becomes conductive and short circuits coil 3b of converter 3. Rotor 3a is thus braked and its rotational speed becomes lower than desired speed Vc.

Also as a result, since resetting input R of counter 15 is kept at state "0", the content of counter 15 increases by one unit at each of signal SC's pulses. When, in the present example, this content passes from the value fifteen to the value sixteen, namely approximately 31.25 milliseconds after flip-flop 13 has changed state, output Q of counter 15 passes to state "1".

Flip-flop 13 then again takes the state wherein its outputs Q and $\overline{Q}$ are respectively at state "0" and state "1".

Transistor 16 is thus again blocked, so that rotor 3*a* is no longer braked and its rotational speed can increase again.

If, just after the following moment tm, output Q1 of up-down counter 11 is again at logic state "1", the process which has just been described is repeated. The advance of rotor 3*a* with respect to its desired angular position, which obviously decreases each time that rotor 3*a* is braked, is eventually becomes zero.

When this advance becomes zero, output Q1 of up-down counter 11 takes state "0", and rotor 3*a* is not braked again until it is again in advance of its desired angular position and output Q1 of counter 11 consequently passes to state "1".

When rotor 3*a* is retarded with respect to its desired angular position just after one of moments tm defined hereinbefore, output Q1 of counter 11 is at state "0".

As long as this retardation is sufficiently small for the content of counter 11 to be less than $2^{(n-2)}$, output Q2 of counter 11 is also at state "0". Consequently, the outputs of gates 12 and 25 and outputs Q of flip-flops 13 and 24 are also at state "0". Consequently, transistors 16 and 27 remain in their blocked state and, in particular, coil 3*b* is not short-circuited at any time.

If, in addition, the driving torque provided by mainspring 2 is greater than or equal to limit torque CL defined hereinbefore, the rotational speed of rotor 3*a* may remain or tend to be become greater than desired speed Vc.

The retardation of rotor 3*a* with respect to its desired angular position thus tends to become zero.

This situation remains unchanged until the retardation becomes zero and rotor 3*a* is in advance with respect to its desired angular position. Output Q1 of counter 11 then passes to state "1" and the braking process described hereinbefore begins again.

If the driving torque provided by mainspring 2 becomes less than limit torque CL defined hereinbefore, the electrical energy generated by converter 3 becomes insufficient to supply properly the various components of enslaving circuit 7.

However, as mentioned hereinbefore, accumulator 29 is then at least partially charged, so that device 28 keeps voltage Ua at a value such that the components of circuit 7 operate properly. The electrical energy necessary for this operation is then provided, at least partially, by accumulator 29 of device 28.

Since the driving torque provided by mainspring 2 has become less than limit torque CL, mainspring 2 can no longer drive rotor 3*a* at its desired rotational speed Vc and, a fortiori, at a higher speed than said speed Vc. Rotor 3*a* thus begins to have a retardation, with respect to its desired angular position, which can no longer be corrected in the manner described hereinbefore.

When this retardation becomes sufficiently large for the content of counter 11 to reach its value $2^{(n-2)}$, output Q2 of counter 11 takes state "1", whereas output Q1 of the later remains of course at state "0".

As a result the output of gate 25 passes to state "1" as does output Q of flip-flop 24.

Since rotor 3*a* is retarded with respect to its desired position, signal SM is still at state "0", at the moment when output Q of flip-flop 24 takes state "1". Output Q of time delay 21 thus remains at state "0", the output of gate 23 remains at state "1" and transistor 27 remains blocked.

When, at the following moment tm, rotor 3*a* reaches the angular position where voltage Ug passes its value zero to then become positive and signal SM thus takes its state "1", time delay 21 begins to operate.

As was mentioned hereinbefore, output Q of time delay 21 generates a pulse IC of duration D after a delay time T has elapsed since afore-mentioned moment tm.

During this pulse IC, output Q of time delay 21 is at state "1", so that the output of gate 23 is at state "0" and transistor 27 is conductive.

During this pulse IC, coil 3*b* thus receives a pulse, which will be designated IM, during which it is subjected to supply voltage Ua. This pulse IM is synchronous with pulse IC, i.e. it begins after the same delay T as the latter with respect to aforementioned moment tm, and it has the same duration D as said pulse IC.

It was seen hereinbefore that supply voltage Ua is greater than the peak value of voltage Ug provided by generator 3. Whatever the value of voltage Ug at the moment when pulse IM is applied to coil 3*b*, this pulse IM thus causes a current to pass in coil 3*b*, and thus a magnetic field to be applied to the permanent magnet of rotor 3*a*. In a well known manner, the interaction of this magnetic field and that which is generated by the permanent magnet of rotor 3*a* causes a torque to be applied thereto. This torque will be called an electromagnetic torque in the following description to distinguish it from the mechanical torque applied to rotor 3*a* by mainspring 2.

For a reason which will be made clear hereinafter, this electromagnetic torque must tend to cause rotor 3*a* to rotate in the same direction as the mechanical torque provided by mainspring 2.

For this purpose time delay 21 is arranged so that delay time T of pulse IC with respect to the passage of voltage Ug by its zero value at moment tm defined hereinbefore is less than a half period of said voltage Ug. This voltage Ug is thus positive when pulse IM is applied to coil 3*b*, and the electromagnetic torque supplied to rotor 3*a* in response to pulse IM has the desired direction. This pulse IM may thus be termed a driving pulse.

Time delay 21 is preferably arranged so that delay time T is substantially equal to a quarter of the period of voltage Ug. Driving pulse IM is thus applied to coil 3*b* while voltage Ug has a value close to its peak value. Those skilled in the art will easily understand that, in these circumstances, the electrical energy supplied to coil 3*b* during driving pulse IM is used in the most efficient manner, since rotor 3*a* has then an angular position such that the electromagnetic torque to which it is subjected has a substantially equal value to its maximum value.

During driving pulse IM, converter 3 thus operates like a motor and converts the electrical energy received by its coil 3*b* into mechanical power. For a reason which will be made clear hereinafter, duration D of this pulse IM which determines the quantity of electrical energy received by coil 3*b*, is selected in such a way that the resulting quantity of mechanical power is sufficient to accelerate rotor 3*a* to a higher speed than its desired speed Vc.

Those skilled in the art will understand that it is not possible to specify the value of this duration D any further, since such value depends upon the features of converter 3 and the mechanical elements which are connected to rotor 3*a*, i.e. in particular mainspring 2 and time display hands 6. Those skilled in the art will however, have no difficulty in determining this duration D in each particular case, for example by tests.

In a prototype made by the Applicant, wherein the period of voltage Ug was 250 ms as in the assembly described hereinbefore, very good results were obtained by making time delay 21 in such a way that delay time T and duration D were respectively equal to 60 ms and 4 ms, pulse IM being thus still practically symmetrical, in time, with respect to the moment when voltage Ug passes its peak positive value.

As long as output Q of flip-flop 24 remains at state "1", coil 3*b* receives a driving pulse IM at each period of voltage Ug or at each revolution of rotor 3a, which, in the present example, amounts to the same thing. Since this driving pulse IM has the aforementioned features, the rotational speed of rotor 3a becomes, or remains, higher than its desired speed Vc.

The retardation of rotor 3a with respect to its desired angular position thus decreases, as does the content of counter 11.

When this retardation becomes zero and rotor 3a begins to be in advance with respect to its desired angular position, output Q1 of counter 11 again passes to state "" and output Q of flip-flop 24 thus again passes to state "0", so that coil 3b no longer receives pulse IM.

If mainspring 2 has not been rewound in the meantime, rotor 3a again becomes retarded with respect to its desired angular position and the content of counter 11 again begins to increase. When this content becomes equal to or greater than $2^{(n-2)}$, output Q2 of counter 11 again passes to state "1" and the process described hereinbefore is repeated.

By way of non-limiting example, the number n of flip-flops of counter 11 may be equal to nine, the total capacity of this counter 11 then being equal to $2^9$, i.e. 512. In this example, driving pulses IM thus begin to be generated when the content of counter 11 is equal to $2^7$, i.e. 128. Rotor 3a thus has a retardation of 128 revolutions, or 128×360°, with respect to its desired angular position.

As desired speed Vc of rotor 3a is, again in this example, four revolutions per second, the loss of timepiece 1 is thus 32 seconds.

The mechanical power supplied to rotor 3a during each pulse IM comes, of course, from accumulator 29 of storage device 28. The rotor 3a retardation regaining process which has just been described can thus be repeated as long as accumulator 29 is sufficiently charged.

It is seen that timepiece 1 still operates properly during a certain period of time after the mechanical torque provided by mainspring 2 has become less than limit torque CL defined hereinbefore.

Those skilled in the art know that, even when transistor 16 is blocked and coil 3b is thus not short-circuited, rotor 3a is subjected to a braking torque which is generated in response to the sum of the current consumed by the various electronic components of enslaving circuit 7 and the accumulator 29 charging current.

Those skilled in the art also know that this braking torque has the effect of increasing the acceleration time of rotor 3a, i.e. the time required by rotor 3a to reach and pass its desired speed Vc after the end of the braking process described hereinbefore.

Those skilled in the art will thus easily understand that, in a timepiece such as timepiece 1 described hereinbefore, it is advantageous to design storage device 28 so that the accumulator 29 charging current is limited to the lowest value possible, so that the acceleration time of rotor 3a is thus as short as possible.

In the embodiment shown schematically and by way of non-limiting example in FIG. 3, the timepiece according to the present invention is designated by the reference 31.

Like timepiece 1 of FIG. 2, timepiece 31 includes a mainspring mechanically coupled to the rotor of an electromechanical converter and to means for displaying the current time, and the coil of this converter is connected to a rectifier circuit. These various components of timepiece 31 are designated by the same references as the corresponding components of timepiece 1 and will not be described again here since they can be identical thereto.

Timepiece 31 also includes a circuit for enslaving the real rotational speed of rotor 3a to its desired speed Vc, which is designated in this case by the reference 32.

Each component of enslaving circuit 32 which is designated by the same reference as one of the components of enslaving circuit 7 of FIG. 2 is identical to the latter and operates in the same manner. These components of circuit 32 will not therefore be described again here. Moreover, all these components of circuit 32 are connected to each other like the corresponding components of circuit 7, with few exceptions. These exceptions will be described now, at the same time as the few components of enslaving circuit 32 which do not exist in enslaving circuit 7.

Thus, in enslaving circuit 32, the gate of transistor 16 is not directly connected to output Q of flip-flop 13 as is the case in enslaving circuit 7, but it is connected to the output of an AND gate 33 one input of which is connected to said output Q of flip-flop 13.

A second input of gate 33 is connected to the output Q of an R-S type flip-flop 34 whose input S is connected to the output of an AND gate 35 and whose input R is connected to the output of inverter gate 26.

Like the other flip-flops 13 and 24 described hereinbefore, flip-flop 24 is sensitive to the leading edges of the signals which it receives at its inputs S and R, which means that its output Q takes state "1" and state "0" in response to each passage of its input S and, respectively, its input R from state "0" to state "1". Moreover, flip-flop 34 is also connected to the initialisation circuit mentioned in the description of timepiece 1, so that its output Q takes state "0" in response to the initialisation pulse generated by this circuit.

Gate 35 includes two inputs which are respectively connected to the output Q1 of counter 11 and, via an inverter gate 36, to the output Q2 of said counter 11.

In enslaving circuit 32, the negative terminal 28b of storage device 28 is not directly connected to terminal 5c of rectifier 5, as is the case in enslaving circuit 7, but it is connected to the drain of an n type MOS transistor 37, whose source is connected to said terminal 5c and thus to the reference potential.

The gate of transistor 37 is connected to the output of an OR gate 38 having two inputs respectively connected to output Q1 of counter 11 and, via an inverter spacing gate 39, to the output of gate 23

Like transistor 16, transistor 37 is blocked or conductive according to whether its gate is at state "0" or state "1" since it is of the n type and its source is connected to the reference potential.

The operation of timepiece 31 is for the most part identical to that of timepiece 1 of FIG. 2. The details of the operation of timepiece 31 which do not appear in the following description can thus be found in the description of the operation of timepiece 1 which was made hereinbefore.

As in the case of timepiece 1 of FIG. 2, outputs Q1 and Q2 of counter 11 of timepiece 31 are both at state "0" when rotor 3a of converter 3 is retarded with respect to its desired angular position, and when this retardation is relatively small since the content of counter 11 is less than $2^{(n-2)}$.

In these circumstances, the output of gate 12, the output Q of flip-flop 13 and the output of gate 33 are at state "0", so that transistor 16 is blocked.

Likewise, the output of gate 25 and the output Q of flip-flop 24 are at state "0" so that the output of gate 23 is at state "1" and the output of inverter gate 39 is at state "0". The output of gate 38 is thus at state "0" since its two inputs are at state "0" and transistor 37 is blocked.

If, in addition, the driving torque provided by mainspring 2 is greater than or equal to limit torque CL, the rotational speed of rotor 3a can remain or tend to become higher than its desired speed Vc, and the retardation of said rotor 3a with respect to its desired angular position tends to become zero.

It is seen that, in the circumstances which have just been described and contrary to that which occurs in the case of timepiece 1 of FIG. 2, the electric connection between storage device 28 and rectifier 5 is interrupted. Accumulator 29 of this storage device 28 thus cannot absorb any current, whatever its state of charge. The current which has to supply converter 3 is thus strictly limited to that which is absorbed, after rectification effected by rectifier 5, by the other components of enslaving circuit 32.

Consequently, the braking torque applied to rotor 3*a* in response to the current provided by converter 3, and thus the time which is necessary for said rotor 3*a* to recover its retardation with respect to its desired angular position, are less in the present case of timepiece 31 than in the case of timepiece 1 of FIG. 2, all other things being equal.

If, conversely, again in the circumstances which have just been described, the driving torque provided by mainspring 2 is less than limit torque CL, the rotational speed of rotor 3*a* remains less than its desired speed Vc and the retardation of rotor 3*a* with respect to its desired angular position increases.

When this retardation becomes such that the content of counter 11 reaches the value $2^{(n-2)}$, output Q2 of counter 11 passes to state "1".

Since output Q1 of counter 11 is still at state "0", transistor 16 remains blocked.

Conversely, since output Q2 of counter 11 is kept at state "1", the output of gate 25 passes to state "1", as does the output Q of flip-flop 24.

During each pulse IC supplied by the output of time delay 21, the output of gate 23 passes to state "0", which makes transistor 27 conductive. Simultaneously, the output of inverter gate 39 and, therefore, the output of gate 38 pass to state "1" so that transistor 37 becomes conductive.

As a result, during each pulse IC, storage device 28 is again connected to the various components of enslaving circuit 32 and, in particular, to transistor 27.

As in the case of timepiece 1 of FIG. 2, coil 3*b* of converter 3 thus receives, in response to each pulse IC, a driving pulse IM via transistor 27, and the electrical energy supplied to this coil 3*b* during said driving pulse IM is supplied by accumulator 29.

Likewise, if accumulator 29 contains sufficient electrical energy, each pulse IM causes an acceleration of rotor 3*a* such that the rotational speed thereof becomes or remains higher than its desired speed Vc, and the retardation of rotor 3*a* with respect to its desired angular position tends to become zero although the driving torque supplied by mainspring 2 is less than limit torque CL.

Again, as in the case of timepiece 1 of FIG. 2, output Q1 of counter 11 of timepiece 31 is at state "1" when rotor 3*a* of converter 3 is advanced with respect to its desired angular position. Moreover, if this advance is relatively small and the content of counter 11 is greater than or equal to $3.2^{(n-2)}$, output Q2 of counter 11 is also at state "1".

In these circumstances, the output of inverter gate 36 is at state "0", so that the output of gate 35, the output Q of flip-flop 34 and the output of gate 33 are permanently at state "0".

Contrary to that which occurs in timepiece 1 of FIG. 2, transistor 16 is thus permanently blocked in this case, although rotor 3*a* is in advance with respect to its desired angular position.

However, the output of gate 38 is permanently at state "1", so that transistor 37 is conductive and storage device 28 is connected, also permanently, to rectifier 5 and, of course to the other components of enslaving circuit 32.

Accumulator 29 of storage device 28 thus permanently absorbs a charging current whose intensity is greater the smaller the quantity of electrical energy stored in said accumulator 29 and the higher the maximum capacity thereof.

This accumulator 29 charging current is obviously supplied by converter 3, via rectifier 5, and thus contributes to the creation of the braking torque applied to rotor 3*a*.

It is easily seen that this accumulator 29 charging current must be higher than a certain limit, which is higher the greater the driving torque provided by mainspring 2, so that the braking torque applied to rotor 3*a* imposes thereon a lower rotational speed than its desired speed Vc.

If this condition is fulfilled, the advance of rotor 3*a* with respect to its desired angular position decreases, although, in this case, transistor 16 is not conductive and thus does not short-circuit coil 3*b*.

This situation obviously does not change as long as rotor 3*a* is advanced with respect to its desired angular position and the accumulator charging current remains higher than the limit value defined hereinbefore.

If this advance of rotor 3*a* becomes zero while the charging current is still greater than said limit value, outputs Q1 and Q2 of counter 11 then both pass to state "0", as does the output of gate 38. As a result, transistor 37 is again blocked, so that accumulator 29 no longer absorbs any current. The braking torque applied to rotor 3*a* is then only caused by the current absorbed by the other components of enslaving circuit 32 and the rotational speed of said rotor 3*a* can again pass desired speed Vc.

If, conversely, the accumulator 29 charging current becomes less than the limit value defined hereinbefore before the advance of rotor 3*a* has become zero, this advance no longer decreases, and even increases, since the braking torque applied to rotor 3*a* can no longer impose thereon a lower speed than its desired speed Vc.

The content of counter 11 thus decreases, in such a case, and when this content becomes less than $3.2^{(n-2)}$, output Q2 of counter 11 passes to state "0", while output Q1 thereof obviously remains at state "1".

The output of inverter gate 36 and the output of gate 35 thus pass to state "1", as does output Q of flip-flop 34.

When the output Q of flip-flop 13 passes to state "1" in response to the passage of measuring signal SM to state "1", the output of gate 33 also passes to state "1", which makes transistor 16 conductive, until the output Q of time delay 21 itself passes to state "1".

When transistor 16 is conductive, it short-circuits coil 3*a* and, as in the case of timepiece 1, the braking torque applied to rotor 3*a* imposes thereon a lower rotational speed than its desired speed Vc.

The advance of rotor 3*a* with respect to its desired angular position thus decreases although the accumulator 29 charging current is less than the limit value defined hereinbefore.

This situation remains unchanged as long as rotor 3*a* is advanced with respect to its desired angular position, transistor 16 short-circuiting coil 3*b* at each revolution of rotor 3*a*.

When the advance of rotor 3*a* becomes zero, outputs Q1 and Q of counter 11 both pass to state "0", so that transistors 16 and 37 are again permanently blocked and the rotational speed of rotor 3*a* can thus again pass desired speed Vc.

It can be seen that, in timepiece 31 which has just been described, at least a portion of the electrical energy generated by converter 3 when rotor 3*a* thereof is in advance with respect to its desired angular position and its rotational speed must therefore be decreased to a lower value than desired speed Vc, is used to charge accumulator 29 of storage device 28. In timepiece 1 of FIG. 2, however, this same portion of electrical energy generated in these conditions is dissipated by the Joule effect, mainly in coil 3b of converter 3 and in transistor 16.

As a result, the autonomy of timepiece 31 is further increased, all other things being equal, with respect to the autonomy of timepiece 1.

Those skilled in the art will easily understand that, in timepiece 31, it is advantageous to design storage device 28 so that the accumulator 29 charging current is unlimited or, if required, this charging current is at most limited to the value above which accumulator 29 risks being damaged.

Likewise, it is also advantageous to select accumulator 29 so that its nominal capacity is as high as possible.

It is seen that the autonomy of a timepiece according to the present invention is markedly greater than the autonomy of a known timepiece such as those which are disclosed in the aforementioned European Patent Application Nos. 0 239 820 and 0 679 968.

This is obviously due to the fact that a timepiece according to the present invention includes a storage device capable of storing, in the form of electrical energy, a portion of the mechanical power stored in its mainspring, as well as means which allow this electrical energy to be used to operate the timepiece after the mainspring has been completely let down.

It is obvious that the increase in autonomy of a timepiece according to the present invention cannot generally be given a number since it depends upon the features of its various components, and in particular, upon the capacity of the accumulator forming part of its storage device.

It is seen that if this capacity is such that the quantity of electrical energy that the accumulator can store is more or less equal to that which corresponds to the quantity of mechanical energy E2 defined hereinbefore, and this latter is more or less equal to the quantity of mechanical energy E1 also defined hereinbefore, the autonomy of the timepiece is practically doubled, all other things being equal, with respect to that of a known timepiece of the same type.

However, the mainspring of whatever type of timepiece, is generally rewound numerous times before the mechanical torque which it provides becomes less than limit torque CL. As a result, the mechanical energy which is available after conversion into electrical energy, for charging the storage device accumulator of a timepiece according to the present invention is generally much greater than mechanical energy E2.

It is thus possible, and even desirable, to fit the storage device of a timepiece according to the present invention with an accumulator having a capacity such that it can store a greater quantity of electrical energy than that which corresponds to quantity of mechanical energy E2 defined hereinbefore. Despite its significant capacity, this accumulator is generally completely charged when the driving torque supplied by the mainspring of this timepiece becomes less than limit torque CL defined hereinbefore. As a result, the autonomy of a timepiece whose storage device includes such an accumulator is further increased.

It is obvious that numerous modifications can be made to the timepiece according to the present invention whose two embodiments have just been described, without departing from the scope of this invention. Only a few of these modifications will be mentioned hereinafter.

Thus, for example, those skilled in the art will see without any difficulty that the converter of a timepiece according to the present invention may include more than one coil and/or its rotor may include a multi-polar permanent magnet. This rotor may also include several bipolar or multi-polar magnets.

In such cases, the period of the alternating voltage generated by the converter is obviously a sub-multiple of the period of rotation of such converter's rotor. The timepiece is then of course preferably arranged so as to provide a driving pulse, when necessary, at each period of said voltage.

On the other hand, enslaving of the real angular position of the converter rotor of a timepiece according to the present invention to its desired angular position may be achieved in a different manner to that which has been described hereinbefore, for example in the manner disclosed in aforementioned European Patent Application No. 0 239 820.

The means which generate the driving pulses designated IM in the description hereinbefore may also be modified.

For example, these means may be arranged so as to generate, when necessary, two driving pulses at each period of the voltage generated by the converter. In such a case, it is advantageous for one of these driving pulses to be positive and applied to the converter coil when the alternating voltage generated thereby is close to its peak positive value, as in the examples described hereinbefore, and for the other of these driving pulses to be applied to said coil when the voltage is close to its peak negative value. This latter driving pulse must obviously also be negative, so as also to accelerate the generator rotor.

It is to be noted that the number of driving pulses applied to the converter coil at each period of the voltage generated by the converter, when necessary, may also be greater than two.

Again by way of example, the driving pulse generating means may also be modified so that the latter are generated in different conditions to those which were described hereinbefore. Thus, these means may be arranged so that generation of these driving pulses begins and/or ends earlier or later than has been described. In particular, and again for example, these means may be arranged so that generation is only interrupted when the value of the comparison signal between the real angular position of the converter rotor and its desired angular position is representative of a certain advance of such rotor with respect to this desired angular position, and not as soon as this value indicates that the retardation of the rotor has become zero as in the examples described hereinbefore. Likewise, these means may be arranged so that generation of the driving pulses begins as soon as the comparison signal value represents a retardation, however small, of the rotor with respect to its desired angular position.

Likewise, in a timepiece according to the present invention such as that which is shown in FIG. 3, the enslaving circuit can be arranged so that the braking transistor, i.e. transistor 16 of FIG. 3, is made conductive or blocked for different comparison signal values than those which were mentioned hereinbefore. In particular, this enslaving circuit may be arranged so that this braking transistor is already made conductive when this value is still higher than $3.2^{(n-2)}$, the advance taken by the converter rotor when the storage device accumulator charging current becomes less than the limit defined hereinbefore thus being able to be reduced.

What is claimed is:

1. A timepiece including:
   an electromechanical converter including a rotor having at least one permanent magnet and at least one coil magnetically coupled to said magnet for generating a first electrical energy in response to a rotation of said rotor;

a mechanical power source mechanically coupled to said rotor for applying thereto a first driving torque causing said rotation of said rotor in a determined direction and at a rotational speed higher than a determined desired speed, said rotor having a real angular position which fluctuates permanently during said rotation;

means for displaying time information mechanically coupled to said rotor and to said mechanical power source; and enslaving means including means for generating a comparison signal having a value representing a difference between said real angular position of said rotor and a desired angular position which fluctuates regularly at said desired speed, and braking means responding to said comparison signal to apply a braking torque imposing a lower rotational speed on said rotor than said desired speed when said difference constitutes an advance of said real angular position of said rotor with respect to said desired angular position;

wherein said enslaving means further include control means responding to said comparison signal to apply a second driving torque to said rotor also causing said rotation of said rotor in said determined direction and at a higher rotational speed than said desired speed when said difference is a retardation of said real angular position of said rotor with respect to said desired angular position and said retardation is greater than a determined retardation.

2. A timepiece according to claim 1, wherein said control means also respond to said comparison signal to stop applying said second driving torque to said rotor when said difference has become zero again.

3. A timepiece according to claim 1, wherein said control means also respond to said comparison signal to stop applying said second driving torque to said rotor when said difference is an advance of said real angular position of said rotor with respect to said desired angular position and said advance is greater than a determined advance.

4. A timepiece according to claim 1, wherein said control means include storage means for storing a second electrical energy formed by a portion of said first electrical energy and are arranged so as to apply said second driving torque in response to said second electrical energy stored in said storage means.

5. A timepiece according to claim 4, wherein said converter generates said first electrical energy under an alternating voltage having alternately a first and second polarity, and wherein said control means are arranged so as to apply to said coil, when said alternating voltage has said first polarity, a first driving pulse also having said first polarity, said second driving torque being applied to said rotor in response to said first driving pulse.

6. A timepiece according to claim 5, wherein said control means are arranged so as to further apply to said coil, when said alternating voltage has said second polarity, a second driving pulse also having said second polarity, said second driving torque also being applied to said rotor in response to said second driving pulse.

7. A timepiece according to claim 4, wherein said control means include connection means responding to said comparison signal to allow said storage means to store said second electrical energy only when said difference is an advance of said real angular position of said rotor with respect to its desired angular position, and wherein said braking means are arranged so as to apply said braking torque to said rotor only when said advance of said rotor is greater than a determined advance.

* * * * *